United States Patent [19]
Sakai et al.

[11] 4,009,337
[45] Feb. 22, 1977

[54] STORED PROGRAM CONTROL TYPE ELECTRONIC EXCHANGE SYSTEM

[75] Inventors: Shigeo Sakai; Akira Ogishima; Akira Imada; Tetsuya Matsuno; Kazuo Suzuki; Susumu Sugou, all of Tokyo, Japan

[73] Assignee: Oki Electric Industry Company, Ltd., Tokyo, Japan

[22] Filed: Oct. 10, 1974

[21] Appl. No.: 513,815

[30] Foreign Application Priority Data

Oct. 16, 1973 Japan .............................. 48-115363

[52] U.S. Cl. ...................... 179/18 ES; 179/7 MM; 179/18 BG
[51] Int. Cl.² ..................... H04Q 3/54; H04M 3/42
[58] Field of Search ....... 179/18 FF, 18 FG, 18 ES, 179/99, 18 DA, 18 BG, 7 MM

[56] References Cited

UNITED STATES PATENTS

| | | | |
|---|---|---|---|
| 3,344,235 | 9/1967 | Green et al. | 179/18 BG |
| 3,626,105 | 12/1971 | DeJean et al. | 179/18 ES |
| 3,626,108 | 12/1971 | Oswald et al. | 179/18 ES |
| 3,651,272 | 3/1972 | Knollman | 179/18 ES |
| 3,697,695 | 10/1972 | Pommerening et al. | 179/7 MM |
| 3,718,907 | 2/1973 | Altenburger | 340/147 R |
| 3,746,797 | 7/1973 | Meise, Jr. et al. | 179/18 D |
| 3,821,485 | 6/1974 | Harrington et al. | 179/18 DA |
| 3,868,482 | 2/1975 | Colas | 179/18 FF |
| 3,870,823 | 3/1975 | Gayler et al. | 179/7 MM |

FOREIGN PATENTS OR APPLICATIONS 1,158,585 12/1963 Germany ...................... 179/18 FF Primary Examiner—Thomas W. Brown
Attorney, Agent, or Firm—Kenyon & Kenyon

[57] ABSTRACT

A small scale electronic telephone exchange system of stored program control type having a plurality of trunks and a central computer has been disclosed. The trunks function to process the real time operation and, therefore, the central computer does not need to operate on a real time basis. The central computer always scans the condition of the trunks and the subscriber's telephone terminals and, upon detecting the change of said condition, it analyzes said change and performs the necessary process for said change. The present exchange system provides many new services but the cost of the system is reasonable.

5 Claims, 13 Drawing Figures

STORED PROGRAM CONTROL TYPE ELECTRONIC EXCHANGE SYSTEM

BACKGROUND OF THE INVENTION

This invention relates to a communication exchange system of stored program control type, which is particularly suitable for an exchange operation of comparatively small scale.

The industrialized society is now advancing into the post-industrial society, so that information is one of the indispensable elements in our daily life just like substances and energy, and there is an increasing demand for quick and accurate collection, transmission, processing, and storage of the information. In the field of communication, which is a means for collecting and transmitting the information, the demand for picture communication and data communication is ever increasing, so that there is a need for the so-called "comprehensive communication network", which is, for instance, a telephone system combined with associated services, such as telegraph, picture transmission, facsimile, and other services.

With conventional communication networks, it has been a general practice to use a switching system or an exchange system of full common-control type, typically the crossbar exchange system, for selectively connecting communication terminal devices. The crossbar exchange system consists of a speech-path network for connecting communication terminal devices and a common controller controlling the network, so that the common controller logically processes selection signals from the calling terminal devices and controls various switches of the speech-path network so as to establish the required speech-path, through which the two parties at opposite terminals of the speech-path communicate.

The control of the conventional communication exchange system, as typified by the crossbar exchange system, is carried out by the so-called wired logic control system. The common controller of the wired logic system uses electromagnetic switches in the main, especially relays, as logic elements, and the different logic elements are interconnected by wiring so as to form various specialized circuits having specific functions. Accordingly, in the switching or exchange operation, the common controller causes the various specialized circuits to fulfil the specific logical operations so as to process selection signals from terminal devices, whereby, the desired speech-path is established through the control of the speech-path network.

If, however, one desires to modify the functions of the communication exchange system of the wired logic type or to add new functions thereto, it is necessary to actually modify the wiring at the related portions or to actually add necessary specialized circuits for the new functions. The work for such modification of the wiring and such addition of the specialized circuits not only results in the temporary interruption of the exchange service during the work, but also requires a considerable amount of skilled labor. Accordingly, the conventional communication exchange systems are comparatively inflexible and inefficient.

As industrialized society advances further into the post-industrial society, an extremely large amount of information is transmitted through communication networks, so that the communication industry is now confronted with the need for technological innovation, both quantitatively and qualitatively. Accordingly, for a communication exchange system in a qualitatively innovated comprehensive communication system, the capability of mere switching operation is not sufficient, and it is required to fulfill various new services for ensuring smooth social and economic activities, especially different kinds of data processing services. In this respect, the aforesaid conventional communication exchange system of wired logic control type is too rigid to meet the various needs of the new age. To mitigate such difficulties of the conventional exchange systems, it has been proposed recently to use a more flexible communication exchange system which is based on the techniques of the stored program control system. Rapid progress in semiconductor technology has produced various high-speed circuit elements, e.g., transistors and integrated circuits (IC), and their availability at low cost has enabled the development of the stored program control system. In developing a communication exchange system based on the stored program control system, notice should be taken of the fact that various exchange processes, such as the detection of the calling subscriber, the pulse counting, and the code conversion, etc., can be accomplished essentially by different combinations of fundamental logical operations, namely, the addition, the substraction, the logical sum, the logical product, and so on. A common controller is formed by using only those fundamental circuits which execute the fundamental logical operations, and the exchange process, e.g., the detection of the calling subscriber, is carried out by switching the fundamental circuits at a high speed in a logical sequence adapted for the specific exchange process. Thus, each of the fundamental circuits is repeatedly used in common for carrying out the different exchange processes.

As apparent from above, the communication exchange system based on the stored program control system replaces the logical wiring of the conventional communication exchange system of wired logic type, which wiring connects various fundamental circuits so as to form specialized circuits suitable for carrying out the desired exchange process, with a program consisting of pre-arranged instructions for switching various fundamental circuits in a sequence corresponding to each of the desired exchange processes. More particularly, the aforesaid program is stored in a memory, and in order to carry out an exchange process, the program necessary for the process is read out from the memory so as to quickly switch some of the various fundamental circuits by the instructions of the program in a predetermined sequence for executing the exchange process. Accordingly, with the stored program control system, the modification and addition of the exchange process functions can be accomplished simply by modifying and adding the program, without making any change in the hardware, such as change in the wiring and the addition of specialized circuits and the like. Whereby, a communication exchange system with a high flexibility can be provided by using the stored program control system.

The stored program control system has been developed and practiced in the field of digital computers, for the purpose of general data processing. The communication exchange process is a kind of data processing operation which consists of receiving input information from the subscriber line circuits and transit trunk lines, determining the necessary switching operations based on the input information and the related information such as busy-idle status of the speech-paths and the like, and editing the output information in the form of instructions controlling the speech-paths and related circuits. Accordingly, the communication exchange process based on the stored program control system is essentially similar to operation in the general data processing.

There are, however, unique requirements in the communication exchange process; namely, the very strict requirement for real time operation, the time-divisional multiple process functions of high order, and the complete elimination of total system outages caused by element failures.

As regards the real time operation, it may be safely said that there is no communication exchange system which can be dealt with by batch processing, and every communication exchange operation must be quickly and accurately carried out on a real time basis. For instance, all the input information, such as the call information from a calling subscriber and selection signals, occur irrespectively of the control of the communication exchange system, and such input information is applied to the exchange system quite irrespectively of the operational stage of the communication exchange process. To ensure proper communication exchange processing, loss of any input information is never allowed. In addition, the switching of the called subscriber line to the busy status upon his response and the restoration of his line upon detection of the end of the talk must be completed within a predetermined time. Thus, very strict real time operation is required.

As regards the multiple process function, of all the subscribers of a telephone exchange system, it is generally said that about 10% of them are in talking or busy status, and about 1% of them are in the stage of sending selection signals, so that there are hundreds of subscribers who are requesting the exchange process at a time. If all such requests are processed by a program which is generally used in regular data processing, the memory necessary for it will become huge and its overhead time will become very long, so that the process will become too costly to be practical. Accordingly, in order to process the simultaneously occurring requests from a large number of terminal devices in a quick and economical fashion, time-divisional multiple process functions of high order must be developed.

As regards the reliability or service continuity, the communication exchange system, as exemplified by the telephone exchange system, is never allowed to have a total system outage, because of its social importance. On the other hand, the subscribers who operate the terminal devices are not necessarily specially trained for the operation, so that false operations frequently take place. Besides, there are a large number of speech-paths to be controlled, so that it is reasonable to assume that troubles occur rather frequently in the speech-paths. Accordingly, the program for the stored program control system must be highly stable with such a configuration that, in case of false operation by the subscriber, the subscriber is immediately notified of his false operation, while in the case of troubles in the speech-paths or the like, the troubles do not affect the continuous regular processing of the subscriber's call for service. In the case of any trouble in the common controller where various control functions are highly concentrated, proper countermeasures for it must be taken immediately to prevent the occurrence of a total system outage.

To meet the aforesaid strict requirements, the communication exchange system based on the stored program control system is provided with the following features: namely, the exchange process is controlled by three programs, i.e., a call-processing program which executes various stages of processing the call; an execution-controlling program which controls the sequence of executing the different processes; and a fault-processing program which interrupts the exchange operation at any stage thereof so as to counteract against troubles.

The call-processing program consists of a number of subprograms which are designed to execute different kinds of work corresponding to the different stages of the call process in the exchange operation, such as a call-detecting program, a call-data-analyzing program, a trunk-selecting program, a dial-pulse counting program, a dial-pulse-information-storing program, a digit-analyzing program, and the like. The aforesaid programs are classified into the following three levels, depending on the difference in the level of requirement for real time operation: namely, H (standing for high) level programs which meet a very high requirement for real time operation, such as the dial-pulse-counting program and a DPCT (standing for depict) input side supervisory program; L (standing for low) level programs which meet a comparatively low requirement for the real time operation, such as the trunk-selecting program and the dial-pulse-information-storing program; and B (standing for base) level programs to which the requirement for real time operation is equal to or less than that for L level, such as the call-detecting program, the call-data-analyzing program, and the digit-analyzing program. The aforesaid different kinds of work are processed in groups in a periodic fashion, and the different kinds of work are recorded in a time table in which different "time scales" are assigned to the different levels; for instance, 4 mS (millisenconds) for the H level, 4 mS and 100 mS for the L level, and 100 mS, 1 second, and 1 minute for the B level.

The execution-controlling program controls the sequence in which the aforesaid subprograms of the call-processing program are executed, by using the interruption function which is provided by means of hardware. For instance, the executing sequence of the subprograms of the call-processing program, which are recorded in the time table, is controlled in the order of H level — L level — B level, by causing the interruptions through use of the interruption function based on the clock singals generated at a period of 4 ms. More particularly, the control is at first effected in the H level by means of the clock interruption so as to successively execute those subprograms of the call-processing program which execute the different kind of work recorded in the H level portion of the time table, and upon completion of the different kind of work of the H level, the control shifts to the L level so as to similarly execute the different kinds of work of the L level, and then, the control is shifted to the B level so as to execute the different kinds of work grouped therein. In the course of executing the different kinds of work in the aforesaid sequence, if the aforesaid clock interruption occurs when the call program is executing the call-processing program in the operational stages of the L level or the B level, the process under execution is temporarily halted and the control is shifted to the H level, so that the process execution is started again in the order of H level — L level — B level. In this case, the temporarily halted call-processing program resumes its process starting from the aforesaid point where it was halted, upon completion of the different kinds of work in the H level. Besides, if the H level process takes a long time and the aforesaid clock interruption occurs before completing the H level process, the clock interruption is inhibited due to the nature of the different kinds of work of the H level, so as to continue the process being executed.

The normal exchange operation of the communication exchange system based on the stored program control system efficiently processes a large number of simultaneously occurring requests, without sacrificing the strict real time operation, by periodically and effectively using various call-processing programs through the execution-controlling program.

In the case where a fault has occurred, if the nature of the fault is such that a total system outage may be caused, e.g., a fault in the common devices or a fault caused by erroneous programming, an interruption is effected at the moment of detecting such fault in preference to all the call-processing work at all stages, so as to start the aforesaid fault-processing program. The execution of the fault-processing program causes the execution of a series of processes in a very short time period, which include the identification of the faulty device, the switching from the faulty device to a spare device therefor and the resumption of the service, and at the same time, maintenance personnel are notified of the occurrence of the fault. On the other hand, if the fault which has occurred is not too serious and is not directly related to a total system outage, e.g., an unsatisfactory operation of SP (standing for speech) devices or $\overline{IO}$ (standing for input/output) devices, such fault is processed by a part of the call-processing program. Thus, the service continuity of the communication exchange system is effectively maintained.

A practical example of such communication exchange system based on the stored program control system will now be explained, by referring to the call-connecting operation and the connection of subscribers served by a common central office.

When a call is originated by a calling subscriber, the call is detected by scanning the subscriber line circuits, which scanning is controlled by the call-detecting program executed at a period of 200 mS in the B level. More particularly, the result of the current scanning is compared with the result of the last scanning stored in the memory, so as to detect any change in the status for identifying the calling subscriber. When the originated call is thus detected, the address information relating to the storing area of the magnetic drum which stores the subscriber information of the calling subscriber is found by using an interpretation table, based on the storing-location information of the calling subscriber which is obtained from the bit position where the status change occurred, and a request for reading the magnetic drum is sent out. This request is stored, as a rule, in a memory called an MD (standing for magnetic drum) transaction, and the request waits for the process of reading the magnetic drum.

The process for controlling the magnetic drum is started in the L level at a period of 4 mS, and if there is any queuing MD transaction, the process is started following it. More particularly, the subscriber information of the calling subscriber is read out from the predetermined storing area of the magnetic drum, based on the aforesaid address information, and stored at a predetermined location of the MD transaction, and at the same time, the completion of the process is displayed. The MD transaction which has completed the reading of the magnetic drum is connected to a queuing row, and the control is shifted to a calling-subscriber-analyzing process.

The calling-subscriber-analyzing process is executed at the B level, without any predetermined period, so as to determine the next task to be executed on the basis of the subscriber information read out of the magnetic drum. More particularly, the task of selecting one of the predetermined call-register-trunks, e.g., an individual DP (standing for digital pulse) originating register trunk, is selected, and the process is transferred to the task thus selected. The program for executing the task is dealt with in the B level without any predetermined period, as in the case of the aforesaid analyzing program, and performs two selections; namely, the selection of an idle individual DP originating register trunk by referring to the content of a memory called trunk memory, and the selection of a speech-path between the calling subscriber and the individual DP originating register trunk thus selected on the basis of the link busy-idle information recorded on the map. Upon completion of selecting the speech-path, a speech-path control instruction is edited for connecting the calling subscriber to the register trunk selected, and after storing the instruction in the transaction memory the program waits for the execution of the speech-path control.

The program for processing the speech-path control is executed in the L level at a period of 16 mS. In executing the process, the transaction memory connected to a queuing row is read out, and the control instruction is sent to the speech-path controller in three executing periods, which executing periods are determined by considering the operating times of the crossbar switch and the relays. The speech-path controller controls various speech-path devices based ont he speech-path control instruction, so as to connect the aforesaid calling subscriber to the selected individual DP originating register trunk, whereby, the calling subscriber receives the dial tone.

When the calling subscriber sends out dial pulses after hearing the dial tone, the dial pulses are processed by the dial-pulse-counting program which is executed at the H level at a period of 8 mS. More particularly, the aforesaid individual DP originating register trunk connected to the calling subscriber is scanned each time the aforesaid program is executed, so as to detect the status change by group processing, and the status change thus detected, e.g., the pulse fall, is counted and stored in the supervisory memory.

The dial pulses, which are stored in the supervisory memory be the execution of the dial-pulse-counting program, are supervised or monitored by the $\overline{DPORT}$ (standing for digital pulse originating trunk) digit-storing program which monitors the result of the counting, the last look, and the result of scanning, so as to identify the inter-digit intervals of the dial pulses and to find out any termination of the call without completing the dialling. When the inter-digit interval is identified, the count information of the dial digits is stored in the trunk memory digit by digit by the aforesaid program, and after receiving and storing the predetermined number of digits, the information is stored in the hopper, and the program waits for the digit-analyzing process. The digit-analyzing program is executed at the B level in a non-periodic fashion so as to perform the following work: namely, identifying and selecting a speech-path by using the aforesaid dial information and the subscriber information stored in the trunk memory; determining the sequence of the next tasks to be executed; and transferring the control to the program for executing the tasks thus selected. The establishment of the speech-path is accomplished in a manner similar to the aforesaid connection of the calling subscriber, through the selection of the trunk and the speech-path and editing of the speech-path control instruction.

As explained above, with the communication exchange system based on the stored program control system, none of the trunks or the like devices have any particular logical processing functions except the very simple single function like the transit of information and the supply of speech-carrying current, while, a common controller consisting of a high class processor of high-speed multiple-instruction type is provided, which determines the executing sequence of the call-processing program having subprograms of differently classified levels by means of the execution-controlling program having functions of interruption analysis, level control, wait control, and the like, whereby, the communication exchange process is executed by group-processing each of the subprograms while meeting the real time requirement. Accordingly, the processor and the programs of such communication exchange system must have all the aforesaid functions, regardless of the number of circuits served by the system, so that in the case of a communication exchange system serving a comparatively small number of circuits, the stored programm control system has not been practical because of its high cost due to the comparatively large number of jobs per circuit.

SUMMARY OF THE INVENTION

The object of the present invention is to mitigate the aforementioned difficulty, by providing an economical communication exchange system of comparatively small size based on the stored program control system: wherein various trunks are provided with compound functions including logical process functions, such as counting and storing, so as to minimize the requirement for real time operation, and; the time-divisional multiple process function is performed with a comparatively low-class processor while eliminating the execution-controlling program, by carrying out the exchange process by scanning and supervising the status of the subscriber lines and the trunks with two alternately executed programs, i.e., the subscriber-line-supervising program and the trunk-supervising program, temporarily halting the scanning and supervising operation upon detection of any status change so as to successively execute a series of tasks which are necessary to cause the call to move to the next stable status, resuming the aforesaid scanning and supervising operation after the stable status is reached, and repeating the aforesaid operations.

BRIEF DESCRIPTION OF THE DRAWINGS

The communication exchange system according to the present invention will now be described in detail, by referring to an embodiement, as illustrated in the accompanying drawings, wherein.

DETAILED EXPLANATION OF THE PREFERRED EMBODIMENT

Figure 1:
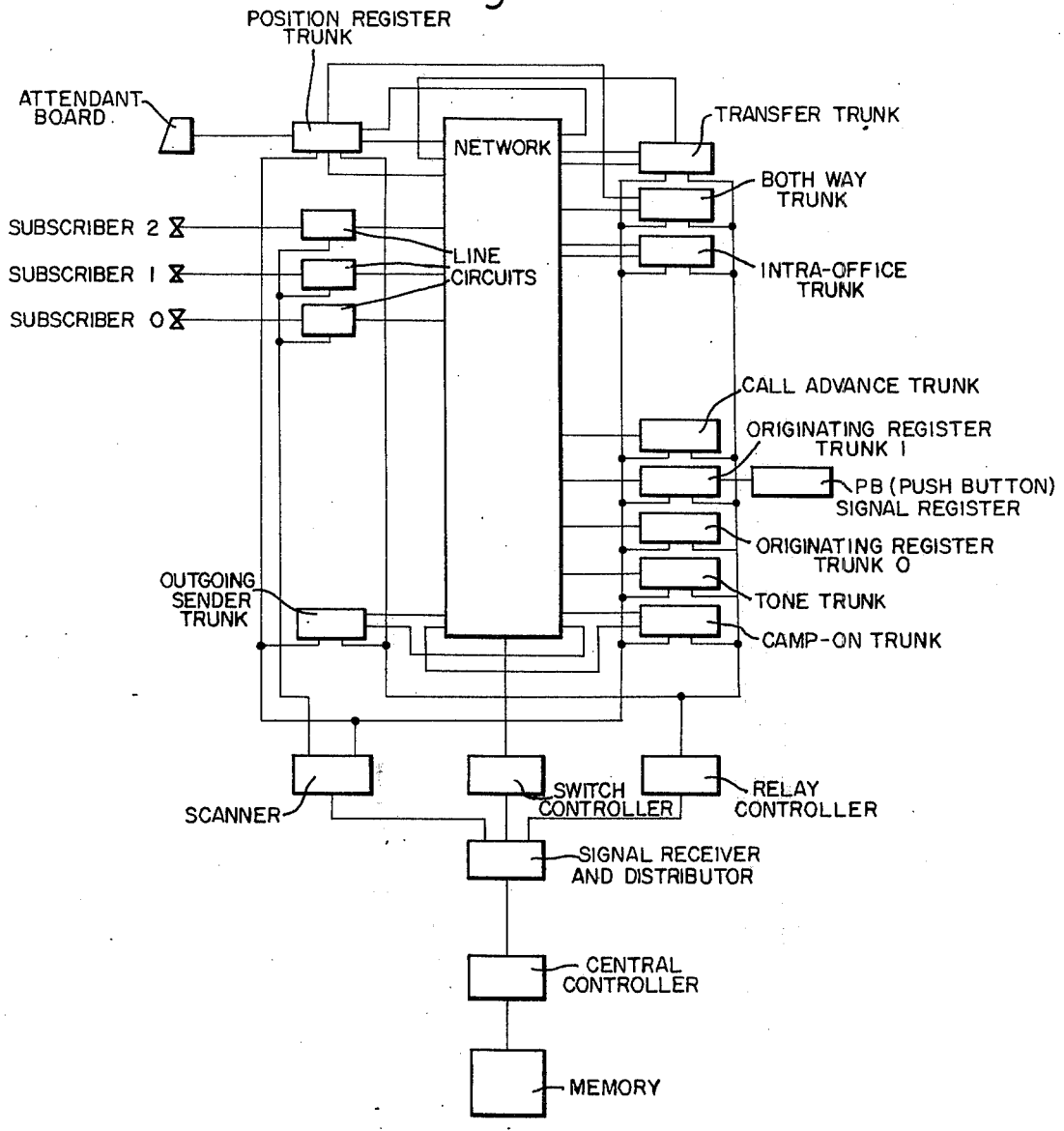
FIG. 1 is a block-diagram of a telephone exchange system embodying the present invention.

FIG. 1 is a block diagram of a communication exchange system according to the present invention, which is, for instance, an automatic private branch telephone exchange system serving about 200 subscriber lines. In the figure, SUB0, SUB1, and SUB2 designate subscribers, and ATT designates an attendant board to be operated by an operator. NW is a speech-path network, LC is a line circuit which is provided for each subscriber, PRT is a position register trunk, BWT is a both way trunk, $\overline{IOT}$ is an intra-office trunk, TFT is a transfer trunk, CAVT is a call advance trunk, CMPT is a camp-on trunk, $\overline{ORTO}$ and $\overline{ORT1}$ are originating register trunks, $\overline{OST}$ is an outgoing sender trunk, TNT is a tone trunk, and PBRC is a PB (standing for pushbutton) signal receiver. At the lower part of the figure, CC is a central controller, MEM is a memory, SRD is a signal receiver and distributor, SCN is a scanner, SC is a switch controller, and RC is a relay controller.

The aforesaid speech-path network NW is, for instance, a switch frame of three-stage connection type, which is formed of two-wire crossbar switches of mechanically holding type, and its operation and restoration are controlled by the switch controller SC and it is mechanically held without any electric holding current. The busy-idle status of each of the links of the speech-path network NW is stored in that area of the memory MEM which is called map, and the stored status is renewed each time the switch controller SC performs the operational or restoring control.

In order to reduce the strict requirement for real time operation, the aforesaid trunks of the different kinds are provided with compound functions selectively consisting of supplying the speech-carrying current, sending out signals, repeating and transferring the information, and the like, so as to reduce the number of reconnections at the speech-path network. Furthermore, the trunks are selectively provided with some logical process functions, such as counting one decimal digit, supervising the timing, storing the information, and the like, so as not to lose the information necessary for excuting the exchange operation even when the period of scanning becomes long.

Figure 11:
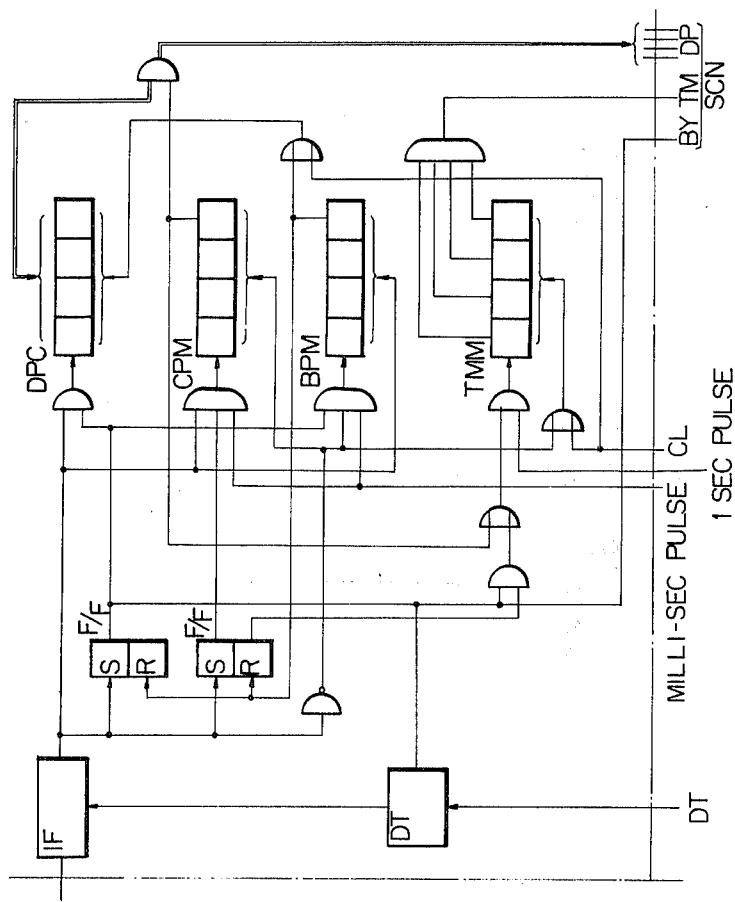
FIG. 11 is a block-diagram of an originating register trunk (ORTO)
Figure 12:
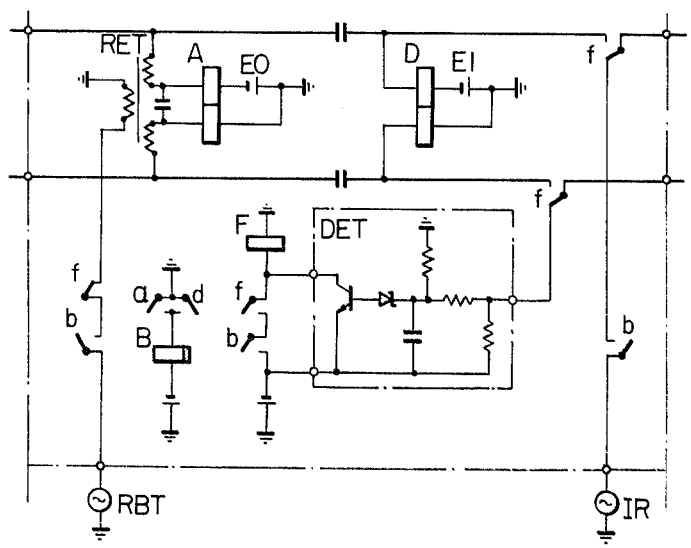
FIG. 12 is a circuit diagram of an intra-office trunk (IOT)

The configurations of the originating register trunk $\overline{ORTO}$ and the intra office trunk IOT are shown in FIG. 11 and FIG. 12, respectively. The originating register trunk $\overline{ORTO}$ functions to store and count one decimal digit, to monitor various kinds of timing relationships, to send the ringing signal, etc. The originating register trunk $\overline{ORTO}$ comprises a dial pulse counting circuit DPC, a C position monitoring circuit CPM, a B position monitoring circuit BPMM, a timing monitoring circuit TMM, a dial tone circuit DT, and an interface circuit IF, etc. The dial pulse counting circuit DPC has a four-bit binary counter which counts one digit of the intraoffice dial pulses, indicates the counted results at a scanning terminal, and stores the same until the scanning unit finishes reading the same. The C position monitoring circuit CPM has a binary counter of four bits which counts the reference pulses of ten milliseconds interval from the end point of each dial pulse till the start point of the next dial pulse, and recognizes the completion of one digit of dial pulse when the content of the binary counter reaches eight. The B position monitoring circuit BPM also has a four-bit binary counter which counts the reference pulses of ten milliseconds interval from the disconnection of the subscriber's loop until the next connection of the same, and recognizes the completion of hanging up the handset by an intra-subscriber when the content of the binary counter reaches eight. The timing monitoring circuit TMM also has a four-bit binary counter which receives and counts the reference pulses of one second interval from the completion of hanging up a hand-set and/or the appearance of output signal of the C position monitoring circuit, until the arrival of the dial pulse, and recognizes the pre-pause which is a time interval between dialed digits when the content of the binary counter reaches fifteen. The dial tone circuit DT functions to transmit a dial tone which indicates the completion of preparation of receiving dial pulses to the intra-subscriber connected to the originating register trunk $\overline{ORTO}$. The interface circuit IF functions to convert the signal level between the inside and outside of the originating register trunk, to detect the connection and disconnection of the subscriber's loop, etc.

On the other hand, the configuration of the intraoffice trunk IOT is shown in FIG. 12, and it functions to monitor the presence of a calling subscriber, to supply the direct current for speech, to monitor the response by a called subscriber, to detect the completion of speech and to send same kinds of signal tones. In FIG. 12, the relay A is energized when the loop circuit in the calling subscriber is completed, and direct speech current is supplied to the loop from the battery EO through the winding of the relay A. The relay A also detects and monitors the condition (disconnection or connection) of the subscriber's loop. The ring back tone is provided to the calling subscriber from the generator RBT through the contact b of the relay B which is energized by the relay A, the contact f of the relay F and the transformer RET. Further, the ringing signal is provided to the called subscriber from the generator IR through the contacts b and f. The relay F is energized when the completion of the loop circuit of the called subscriber is recognized by the fact that the earth potential appears at the input terminal of the detector DET. When the relay F is energized, the ringing and the ring back tone stop, and the battery E1 supplies the direct speech current to the loop circuit of the called subscriber through the winding of the relay D. The relay D monitors the condition (disconnection or connection) of the loop circuit of the called subscriber. The completion of the speech is recognized by the slow release relay B at a predetermined time after both the relays A and D are released.

The central controller CC and the memory MEM are formed by using a small general purpose electronic computer, of which various types have lately been developed under the name of "mini computers". In the case of the illustrated embodiment, the memory MEM is a temporary memory having a storing capacity of 8k words, each word consisting of 16 bits, and a cycle time of 1 to 2 microseconds for reading and writing. The capability of the central controller CC is roughly as follows: namely, to have about 40 different instructions, to have an operational speed of performing addition and subtraction in about several microseconds, and to have several different interrupting levels which are provided by hardwares. The aforesaid memory MEM stores various items which are necessary for controlling and operating the communication exchange system: namely, various programs; busy-idle status information of the speech-path network; the variable data which vary as the exchange control proceeds, e.g., the trunk status information; the subscriber information, e.g., the service class; the fixed data, e.g., the information relating to the conversion of the trunk number and its storing location, and the like. Different storing areas of the memory MEM are given different names, depending on the kinds of data and programs stored therein: namely, the program store, the map, the trunk memory, the subscriber memory, the conversion table, and so on. The above-mentioned central controller CC acts to receive input information which consists of the process request from the scanner SCN, to process the input request by using the program stored in the memory MEM and the various data, and to produce the output information to be applied to the switch controller SC and the relay controller RC by editing control instructions for controlling the aforesaid different trunks.

The scanner SCN is an input device to the communication exchange system, which is a kind of information processing system, and supervises the status of the subscriber line circuits LC and the trunks under the control of the central controller CC, and the result of the scanning operation is successively sent back to the central controller CC, as the scanned information. The scanner SCN alternately scans the status of the subscriber lines and the status of fhe trunks, but there is no specific period for this scanning, because the scanning is temporarily halted upon detection of any status change for executing the operation necessary for the required exchange process. The points to be supervised are arranged in the form of a matrix which has 16 points per row, so as to read the 16 points at on time by specifying each row. In the case of scanning the subscriber lines, the status of 16 subscriber lines are read out at one time, while, in the case of the trunks, the status of one or more trunks are read out at one time depending on the number of scanning points of different trunks being scanned, and the scanned result is sent to the central controller CC.

The switch controller SC and the relay controller RC actually perform the closing and opening operations at the specified cross points of the speech-path network NW and the actuation and restoration of the specified relays of the trunks, in response to the control instructions which are produced by the central controller CC as a result of editing the outcome of the information processing, and the controllers SC and RC have means for informing the central controller CC of the completion of the switch and relay operations. The signal receiver and distributor SRD is an interface which is disposed between the central controller CC and the three devices, i.e., the scanner SCN, the switch controller SC, and the relay controller RC, and it fulfills the functions of receiving, storing, decoding and checking the information, and sending out the information to specific devices.

The characteristics of the communication exchange system according to the present invention will now be described in detail, by explaining the operation for the connection of a calling subscriber, the connection of two subscribers served by a common central office (to be referred to as the "intra-office connection", hereinafter), the connection of an outgoing call through a transit trunk line (to be referred to as the "outgoing call connection", hereinafter), the connection of an incoming call, and the connection for automatic transfer, with reference to the sequence charts of FIGS. 2 through 5 and the status charts of FIGS. 6 through 10.

Figure 2:
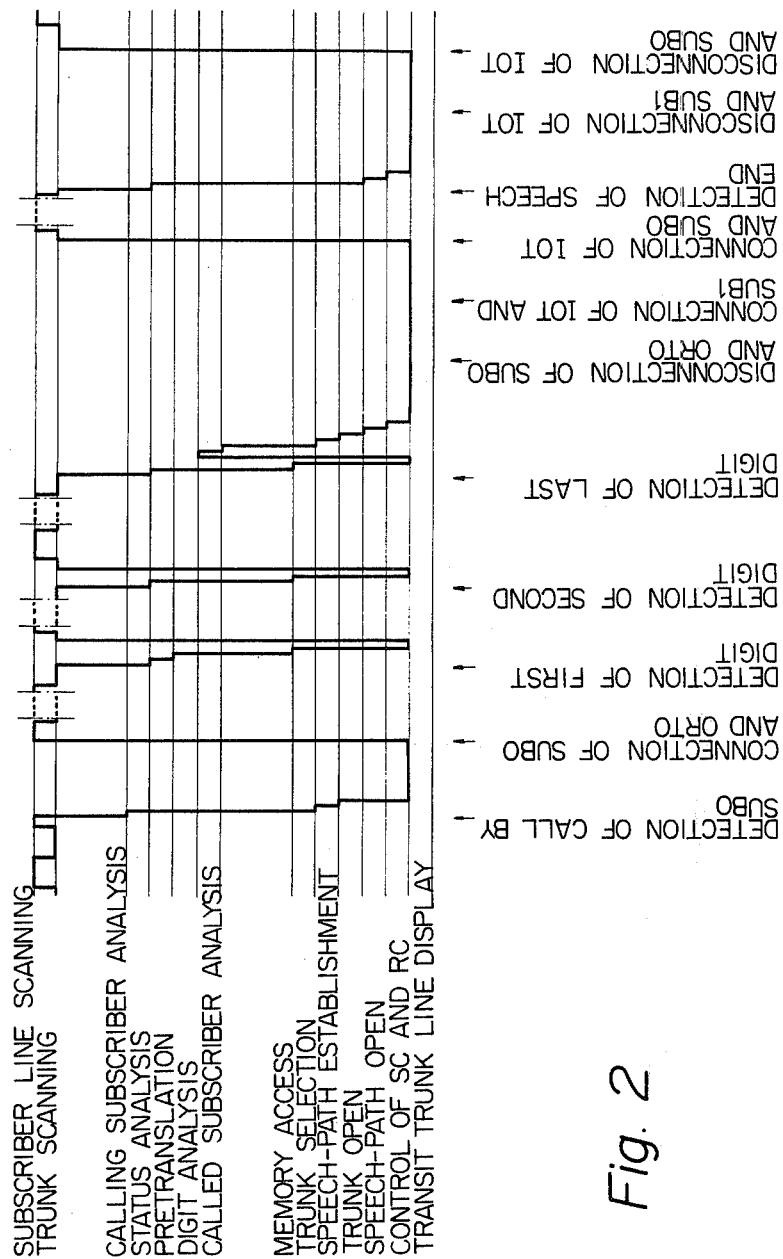
FIG. 2 through FIG. 5 are sequence charts explaining the operation of the system in FIG. 1.
Figure 6:
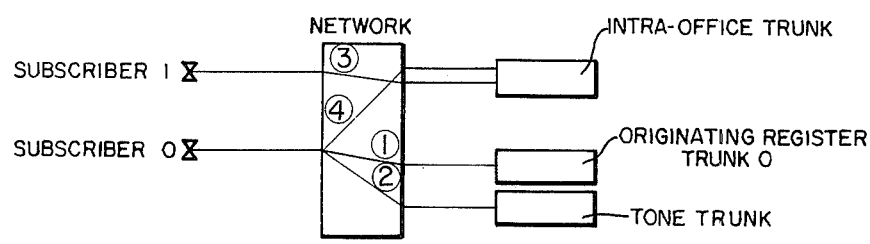
FIG. 6 through FIG. 10 are status charts explaining the operation of the system in FIG. 1.

FIG. 2 is a sequence chart illustrating the operations for the calling subscriber connection and the intra-office connection, and FIG. 6 is a status chart for the operations. A series of operations by the exchange system from the lifting of the handset by the calling subscriber SUB0 through completion of the handing up operation will be explained by referring to FIGS. 2 and 6.

When no task is executed or processed, the central controller CC alternately sends the subscriber scanning instruction and the trunk scanning struction to the scanner SCN, through the signal receiver and distributor SRD, so as to find out any status change at any one of all the subscriber lines served by the communication exchange system and all the trunks thereof. As regards the subscriber line scanning, the information of 16 DP subscribers is read out as a unit by the scanner SCN, as explained above, and the scanned information delivered from the scanner SCN through the signal receiver and distributor SRD is compared with the result of the last scanning (to be referred to as the "last look", hereinafter) which is read out by the last scanning and stored in the supervisory memory of the memory MEM, and status change is detected by checking whether or not the current scanning result coincides with that of the last look. More particularly, the detection of the non-coincidence is the identification of the status change of the subscriber corresponding to the specific bit. If no status change is found in the 16 subscriber lines corresponding to the scanning unit which has been read out in response to the instruction specifying the first row, the next row is specified for reading out the next scanning unit, and a similar operation is repeated until any status change is detected. If the scanning of all the subscriber lines served by the communication exchange system proves that there is no subscriber line whose status is changed, the subscriber scanning process is over and the trunk scanning operation starts. The trunk scanning process is essentially the same as the subscriber scanning, except that one trunk can have a plurality of scanning points.

Now, if the calling subscriber SUB0 picks up his receiver, the line relay in the corresponding subscriber line circuit LC operates. The subscriber scanning process of the scanner SCN reads out this line relay operation and dispatches corresponding scanning information to the central controller CC. The central controller CC reads out that last look from the memory MEM which relates to the corresponding group of subscribers, so as to compare the aforesaid scanning information with the last look thus read out. This comparison can be performed in a simple fashion, for instance, by taking an exclusive OR operation bit by bit. If the comparison indicates that the status change took place at the bit corresponding to the subscriber SUB0, the subscriber scanning process is temporarily halted, and the calling-subscriber-analyzing process starts.

In the calling-subscriber-analyzing process, when the information change is detected, the subscriber SUB0 is identified from the row number which has been read out by the subscriber scanning process at the moment and the bit position where the information change occurred, so as to obtain the storing location information for the subscriber SUB0. Based on this storing location information, the central controller CC gets access to the memory MEM for reading out the data relating to the subscriber SUB0 from the subscriber memory thereof, such as the lockout information and the service class. If the subscriber SUB0 is not in the lockout status, it is identified that a call-connection request has occured, and the processing of the request starts. Based on the aforesaid service class information of the calling subscriber, the corresponding kind of the originating register trunk is determined at first, and an idle originating register trunk is selected by using the information stored in the trunk memory of the memory MEM. Of the two kinds of originating register trunks $\overline{ORT0}$ and $\overline{ORT1}$, as illustrated in FIG. 1, the originating register trunk $\overline{ORT0}$ is a regular originating register trunk which receives the DP signals, while the other originating register trunk $\overline{ORT1}$ has a pushbutton signal receiver PBRC as an accessory, so that, when the selection signals from the subscriber are of DP signal form, the trunk $\overline{ORT1}$ directly receives and counts the DP signals for storing and displaying them, just like the regular originating register trunk $\overline{ORT0}$, but when the PB signals are applied, the trunk $\overline{ORT1}$ causes the pushbutton signal receiver PBRC to receive and convert the signals and to transfer them, and the trunk $\overline{ORT1}$ stores and displays the information as in the case of the DP signals.

When, for instance, the originating register trunk $\overline{ORT0}$ is selected, the central controller CC selects an idle channel, on the map of the memory MEM, between the calling subscriber SUB0 and the originating register trunk $\overline{ORT0}$ thus selected. Upon selection of the idle channel, the stored bit on the map corresponding to a link or the like for the selected channel is rewritten, and a control instruction for the speech-path network NW is edited based on each of such informations, which control instruction is sent to the signal receiver and distributor SRD. The signal receiver and distributor SRD transfers the control instruction from the central controller CC to the specific devices. In the case under consideration, since the control instruction relates only to the control of the speech-path network NW, the signal receiver and distributor SRD transfers all the control instructions received to the switch controller SC. The switch controller SC controls specified crossbar switches, so as to close those cross points which are specified by the control instruction received. As a result, a speech-path, as indicated by the mark ① in FIG. 6, is established in the speech-path network NW, and the switch controller SC confirms the full establishment of the speech-path ① and reports the full establishment to the signal receiver and distributor SRD.

After sending out the control instruction to the speech-path network NW, the central controller CC continuously interrogates the signal receiver and distributor SRD as to whether the execution of the control instruction is completed or not.

This interrogation is effected in order to confirm the completion of a series of processes (four processes in this case; i.e., the calling subscriber analysis, the trunk selection, the speech-path setting, and the control of the SC and RC) which are selected as a result of the analysis of the status change of the calling subscriber SUBO, as detected by the scanning. The interrogation is also aimed at the confirmation of realizing a different stable status (namely, in this case, the completion of the connection between the calling subscriber SUBO and the selected originating trunk $\overline{ORTO}$), which status is reached by carrying out the aforesaid series of processes in the proper sequence. The "stable status" refers to that status of an electronic exchange system which is kept from the completion of one processing stage of the communication exchange operation to the detection of the next status change of the line circuits and the trunks, by the scanner SCN, which processing stage may include the completion of the connection or disconnection between a subscriber and various trunks, reception and storage of dialled digits, transmission or digit information, completion of a request, and the like. What is meant by "a series of processes" is those processes which are carried out successively in a proper sequence in order to shift from one stable status to another. Said series of processes may include one or more of the calling subscriber analysis, the status analysis, pretranslation, the digit analysis, the called subscriber analysis, the access to the memory, the trunk selection, the speech-path setting, the trunk opening, the speech-path opening, the control of the SC and RC, the transit trunk display, and the like. When the switch controller SC reports and the signal receiver and distributor SRD generates the information that the aforesaid execution is completed, the central controller CC identifies that the call being processed has reached a stable stage in which the connection between the calling subscriber SUBO and the originating register trunk $\overline{ORTO}$ is fully established, and the previously halted subscriber scanning is resumed, so as to alternately perform the subscriber scanning and the trunk scanning until the next status change is detected. When the originating register trunk ORTO is connected to the calling subscriber SUBO, the connection forms a loop for exciting the dial tone which is sent to the calling subscriber SUBO.

Hearing the dial tone from the originating register trunk $\overline{ORTO}$, the calling subscriber SUBO starts the dialling. The binary four-bit counter DPC provided in the originating register trunk $\overline{ORTO}$ (FIG. 11) counts and stores the dial pulses thus sent from the calling subscriber SUBO. When the originating register trunk $\overline{ORTO}$ identifies the completion of dialling the first digit by the timing supervision which is generally referred to as the C position, the aforesaid counter displays the count at the scanning terminal provided for each of the binary bits.

When the central controller CC reads out the count displayed in the originating register trunk $\overline{ORTO}$ during the trunk scanning, the controller CC temporarily halts the trunk scanning and enters the status-analyzing process. The controller CC at first identifies the corresponding trunk, i.e., the originating register trunk $\overline{ORTO}$, from the row number and the bit position which were read out by the trunk scanning and finds out the storing location information thereof, and translates and analyzes the count information thus received by means of the pretranslation so as to execute the necessary process, such as the determination of the number of digits to be received. The received count information and the information on the number of digits to be received are stored at the area of the trunk memory corresponding to the specific originating register trunk, by getting access to the memory MEM by using the aforesaid storing location information.

After storing the first digit in the trunk memory, the central controller CC edits the reset instruction for clearing the counter of the aforesaid originating register trunk $\overline{ORTO}$, which reset instruction is sent to the signal receiver and distributor SRD so as to complete a series of processes, and then the previously halted trunk scanning is resumed.

When the originating register trunk $\overline{ORTO}$ receives the aforesaid reset instruction in the form of reset pulses from the central controller CC through the signal receiver and distributor SRD and the relay controller RC, the counter of the trunk $\overline{ORTO}$ is cleared and prepared for the second digit.

The second digit is also counted and displayed by the originating register trunk $\overline{ORTO}$ in the identical manner with the first digit. When reading the display of the second digit by the trunk scanning, the central controller CC temporarily halts the trunk scanning, identifies the originating register trunk $\overline{ORTO}$, gets access to the memory MEM by using the storing location information, and finds out that it is not the last digit by means of the information at the trunk memory. The central controller CC stores the second digit and the information that the second digit has been received at the specific location of the aforesaid trunk memory, sends out another reset instruction in the same manner as the first digit, and resumes the trunk scanning. Similar operations are repeated until the last digit is reached.

At the same time, the originating register trunk ORTO performs the inter-position timing supervision, and if no dial pulse arrives after a predetermined timing period has elapsed, the information relating to such non-arrival of the dial pulse is displayed at a specific scanning terminal so as to request BT (standing for busy tone) process. When detecting this request by the trunk scanning, the central controller CC successively sends the following instructions to the signal receiver and distributor SRD; namely, an instruction to open the speech-path ① in the speech-path network NW, an instruction to establish a speech-path ② between the originating subscriber SUBO and the tone trunk TNT, and an instruction to send out the busy tone. Upon confirming the establishment of the aforesaid speech-path ②, the tone trunk TNT begins to send out the busy tone to the calling subscriber SUBO, detects completion of a hanging up operation by the subscriber SUBO, and performs the timing supervision. If completion of a hanging up operation is detected in a predetermined time, the tone trunk TNT displays the restoring information at its scanning terminal, and when the restoring information is detected by the trunk scanning, the central controller CC performs the control which is necessary for the restoration of the speech-path ②, so as to restore it to its initial status.

If completion of a hanging up operation is not detected during the last mentioned predetermined time, the tone trunk TNT ceases to send out the busy tone and begins to send out the howler tone, and at the same time, performs the detection of completion of the hanging up operation by the subscriber SUBO and the timing supervision. If completion of the hanging up operation by the subscriber SUBO is detected during a predetermined time, the restoration to the initial status is performed in the same manner as with the busy tone. On the other hand, if completion of a hanging up operation by the SUBO is not detected during the last mentioned predetermined time, the tone trunk ceases to send out the howler tone and displays the lockout request at its scanning terminal. In accordance with the lockout request, the central controller CC restores the speech-path ② and locks out the subscriber SUBO by disconnecting his line from the connecting circuitry being operated, and his subscriber number is displayed at the attendant board ATT through the relay controller RC and the position register trunk PRT.

When the calling subscriber SUBO smoothly dials to the last digit, the originating register trunk $\overline{ORTO}$ counts and displays the last digit thus dialled in the same manner as the preceding digits. After detecting this count information, the central controller temporarily halts the trunk scanning, identifies the originating register trunk $\overline{ORTO}$, gets access to the memory MEM by using its storing location information, finds out the arrival of the last digit by recognizing that the number of digits received is now equal to the aforesaid information on the number of digits to be received, which information was stored in the trunk memory, and stores the received last digit at the specific location of the trunk memory. The central controller CC then edits a reset instruction for clearing the counter of the originating register trunk $\overline{ORTO}$, sends out the reset instruction to the signal receiver and distributor SRD, and proceeds to the digit-analyzing process.

The digit-analyzing process is to analyze the selection information, which has been stored in the trunk memory of the memory MEM in the form of a binary coded decimal number, as described in the foregoing, at the location corresponding to the related originating register trunk $\overline{ORTO}$, for the purpose of identifying the type of the service demanded by the calling subscriber SUBO and identifying the called subscriber. As a result, under the present assumption, it will be recognized that the intra-office connection is demanded, and when the subscriber SUB1 is identified as the called subscriber, the busy-idle status of the called subscriber SUB1 will be analyzed and identified.

After confirming that the called subscriber SUB1 is eligible for connection and his line is idle, by means of the aforesaid analysis, the central controller CC starts the process for connecting the two subscribers. This connecting process includes successive controls of the selection of the trunk and the speech-path and the controls of the opening of the trunk and the speech-path. In the trunk-selecting process, search is carried out in the trunk memory of the memory MEM, so as to find out one idle intra-office trunk $\overline{IOT}$, and the trunk memory corresponding to the selected intra-office trunk is rewritten to busy status. In the speech-path-selecting process, as in the case of the preceding trunk-selecting process, a search is carried out in the map of the memory MEM storing the busy-idle information of the links, so as to find out two idle channels, i.e., one between the called subscriber SUB1 and the selected intra-office trunk $\overline{IOT}$ and another one between the calling subscriber SUBO and the selected intra-office trunk $\overline{IOT}$. After the aforesaid two idle channels are selected, the memory bits in the map corresponding to the links relating to the selected idle channels are rewritten to busy status. In the trunk-opening process, the originating register trunk $\overline{ORTO}$ connected to the calling subscriber SUBO is identified and the corresponding trunk memory is rewritten to idle status, and in the speech-path-opening process, the link ① connecting the calling subscriber SUBO to the originating register trunk $\overline{ORTO}$ is identified and the corresponding memory bit on the map is rewritten to idle status.

Then, the central controller CC starts a process for controlling the speech-path network NW. As a part of the control for restoring the speech-path ① connecting the calling subscriber SUBO to the originating register trunk $\overline{ORTO}$, the central controller CC edits a control instruction for restoring the specific cross points of the speech-path network NW, based on the link information identified in the aforesaid speech-path-opening process, and sends out the control instruction to the signal receiver and distributor SRD. The signal receiver and distributor SRD transfers the control instruction to the switch controller SC, and the switch controller SC applies a reset pulse to the reset electromagnet of the specific crossbar switch of the speech-path network NW, in response to the control instruction, so as to restore all the cross points relating to the speech-path ①, and upon confirmation of the restoration, the completion of the restoring operation is reported to the signal receiver and distributor SRD.

After dispatching the control instruction for restoring the speech-path ①, the central controller CC continuously interrogates the signal receiver and distributor SRD as to whether the control instruction has been fully executed or not, and when the completion of executing the control instruction is displayed at the signal receiver and distributor SRD, the central controller CC starts the control for making the connection between the called subscriber SUB1 and the previously selected intra-office trunk $\overline{IOT}$. In making this connection, as in the case of the restoration control, a control instruction is edited for closing the specific cross points, based on the link inforamtion previously identified in the aforesaid speech-selecting process, which control instruction is transferred to the switch controller SC through the signal receiver and distributor SRD. In response to the control instruction, the switch controller SC closes the specific cross points so as to establish the speech-path ③, and reports the completion of the control operation to the signal receiver and distributor SRD.

After recognizing the full establishment of the speech-path ③, the central controller CC establishes the speech-path ④ in the identical manner with the speech-path ③, so as to connect the calling subscriber SUBO to the intra-office trunk $\overline{IOT}$. Being informed of the full establishment of the speech-path ④, the central controller CC identifies that the call being processed has reached one stable status, i.e., the calling subscriber SUBO is connected to the called subscriber SUB1 through the intra-office trunk $\overline{IOT}$, and resumes the previously halted trunk scanning.

After the speech-paths ③ and ④ are completed, the intra-office trunk $\overline{IOT}$ sends the call-back tone to the calling subscriber SUBO and the ringing signal to the called subscriber SUB1, and waits for the response by the called subscriber SUB1. Upon response by the called subscriber SUB1, the sending of the ring-back tone and the ringing signal is terminated, and the speech-carrying electric current is supplied to the two subscribers SUBO and SUB1, and monitoring for the end of talk is performed. The last mentioned processes are carried out by the intra-office trunk $\overline{IOT}$ by itself, and the central controller CC has nothing to do with such processes and control therefor.

Figure 7:
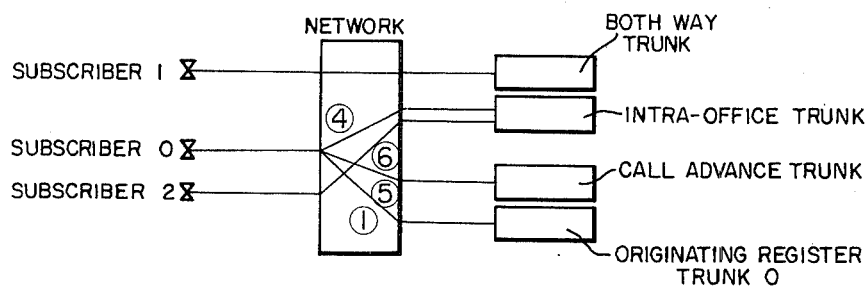

If the called subscriber SUB1 is found to be busy, it has been a general practice to connect the calling subscriber SUB0 to the tone trunk TNT by the aforesaid BT process so as to send the busy tone to him. A special service (call advance service), to be provided in lieu of the BT process, will now be described, by referring to the status chart, as illustrated in FIG. 7. With the call advance service, when the called subscriber SUB1 is busy, the calling subscriber SUB0 performs a certain simple action on his telephone set, e.g., hooking, which action initiates transfer of his call to another pre-registered subscriber SUB2.

Each subscriber eligible for the call advance service has a separate call advance table in the memory MEM, and the call advance table has the subscriber number of the subscriber wanting the call advance service and the subscriber numbers of those subscribers to whom the call is to be transferred in case the first mentioned subscriber is busy. The process from the call origination by the calling subscriber SUB0 to the called subscriber analysis are identical with those in the case of the aforesaid intra-office connection; namely, the establishment of the speech-path ①, the connection to the originating register trunk $\overline{ORTO}$, the counting of the dial pulses, and the called subscriber analysis.

If the called subscriber analysis indicates that the called subscriber SUB1 is, for instance, connected to a transit trunk line through the branch switch trunk BWT, the central controller CC performs the following processes; namely, the selection of an idle call advance trunk CAVT, the selection of an idle channel between the selected call advance trunk CAVT and the calling subscriber SUB0, the indentification of the originating register trunk $\overline{ORTO}$ connected to the calling subscriber SUB0, the identification of the speech-path ① connecting the calling subscriber SUB0 to the originating register trunk $\overline{ORTO}$, and the storing of the storing location information of the calling subscriber SUB0 and the subscriber number of the called subscriber SUB1 in the corresponding trunk memory of the selected call advance trunk CAVT. The central controller CC edits a control instruction based on the information obtained in the preceding processes, and controls the speech-path network NW by the control instruction through the signal receiver and distributor SRD and the switch controller SC, so as to restore the speech-path ① and to newly establish a speech-path ⑤ for reconnecting the calling subscriber SUB0 to the call advance trunk CAVT. The judgement whether or not the calling subscriber SUB0 is eligible for the call advance service is made in the calling-subscriber-analyzing process based on the call service class information of the calling subscriber SUB0.

Figure 13:
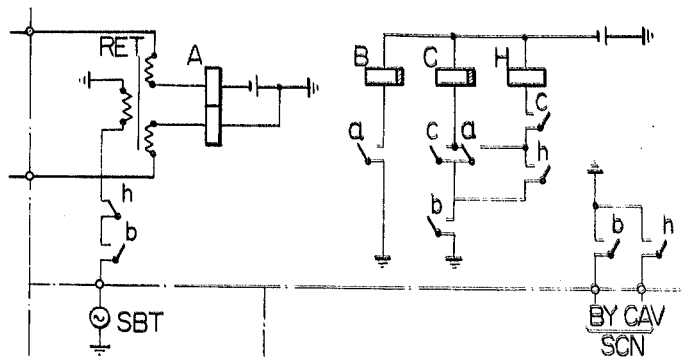
FIG. 13 is a circuit diagram of a call advance trunk (CAVT).

FIG. 13 shows the configuration of the call advance trunk CAVT, which functions at least to monitor the calling subscriber's loop, to detect the hooking (hanging up a hand-set for a brief period), and to send some kinds of signal tones. In FIG. 13, the relay A connected to the calling party whose called party is engaged and said calling party is connected to the call advance trunk CAVT, recognizes the connection and/or disconnection of the subscriber's loop and discriminates the conditions of the loop. When the relay A is energized, the slow release relay B is also energized by the contact $a$, and the special busy tone is sent to the calling subscriber's loop from the generator SBT through the contacts $b$ and $h$, and the transformer RET. Said special busy tone indicates that the called party is engaged and the call advance service has been prepared.

The relay B also energizes the slow release relay C for energizing the relay H which will detect the hooking operation. When the calling party performs the hooking, the calling subscriber's loop is disconnected for an instant, and the short disconnection of the loop is recognized by the relay A. The chattering or the switching operation of the relay A is detected by the self-hold relay H. The relay H indicates the request of the call advance service at the scanning terminal and stops said special busy tone.

When connected to the calling subscriber SUB0, the call advance trunk CAVT sends the aforesaid special busy signal, to the calling subscriber SUB0 so as to inform him that the called subscriber SUB1 is busy. After recognizing the busy status of the called subscriber SUB1, if the calling subscriber SUB0 performs a simple operation requesting the call advance service, such as hanging up the hand-set for a brief period, the call advance trunk CAVT detects such simple operation and displays the occurrence of the call advance service request at its scanning terminal.

Upon detection of the request for the call advance service through the trunk scanning, the central controller CC temporarily halts the trunk scanning and starts the call advance process The central controller CC at first gets access to the trunk memory corresponding to the call advance trunk CAVT which has detected the service request, and selects the specific call advance table in the memory MEM based on the storing locaton information of the calling subscriber SUB0 stored therein. The central controller CC then gets access to the aforesaid call advance table by using the subscriber number of the called subscriber SUB1 stored in the trunk memory, so as to read out the subscriber number of the corresponding subscriber SUB2 who is registered therein. The processes after detecting the subscriber number of the subscriber SUB2 are controlled in the same manner as the aforesaid intra-office connection; namely, the speech-path network NW is controlled in the sequence of the restoration of the speech-path ⑤, the establishment of the speech-path ⑥, and the establishment of the speech-path ④, so as to permit the start of the talk between the subscriber SUB0 and the subscriber SUB2 through the speech-path network NW and the intra-office trunk IOT.

The end of talk is detected by monitoring the loop of the intra-office trunk $\overline{IOT}$. More particularly, the intra-office trunk IOT identifies the end of talk by detecting the completion of the hanging up operation of both the calling subscriber and the called subscriber, and displays it on the scanning terminal for indicating the end of talk. After reading this information through the trunk scanning and confirming the end of talk through the information analysis, the central controller CC starts restoration of the speech-paths ③ and ④ or the speech-paths ⑥ and ④. The intra-office trunk IOT being used is identified at first, and the trunk memory corresponding to it is rewritten so as to display the idle status. The link relating to the speech-path ④ and speech-path ③ or ⑥, connecting the intra-office trunk $\overline{IOT}$ to the calling and called subscribers are identified, and the storing bits in the map corresponding to the links thus identified are rewritten so as to display the idle status. The central controller CC then edits a control instruction for opening the speech-path ③ or ⑥, connecting the intra-office trunk IOT to the called subscriber SUB1 or SUB2, based on the aforesaid identifying information, and sends out the control instruction to the signal receiver and distributor SRD, so as to control the speech-path network NW by means of the switch controller SC for opening the cross points relating to the aforesaid speech-path ③ or ⑥. After the signal receiver and distributor SRD displays the completion of the restoring operation of the speech-path ③ or ⑥, the central controller CC edits a control instruction for opening the speech-path ④ in the same manner as opening the previously opened speech-path, so as to control the speech-path network NW through the signal receiver and distributor SRD and the switch controller SC and to open the cross points relating to the speech-path ④. Upon confirming the restoration of the speech-path ④, the central controller CC resumes the previously halted trunk scanning and waits for the occurrence of a new process request.

In a communication exchange system wherein the holding time is a problem, the duration of the meaningless holding of a speech-path can be shortened by providing a function in the intra-office trunk IOT which separately detects and displays the completion of the hanging up operation by the calling subscriber and the called subscriber, respectively. Whereby, whenever completion of a hanging up operation by one of the two subscribers is detected through the trunk scanning, the speech-path connecting them is immediately controlled and opened regardless of the status of the other subscriber.

Figure 3:
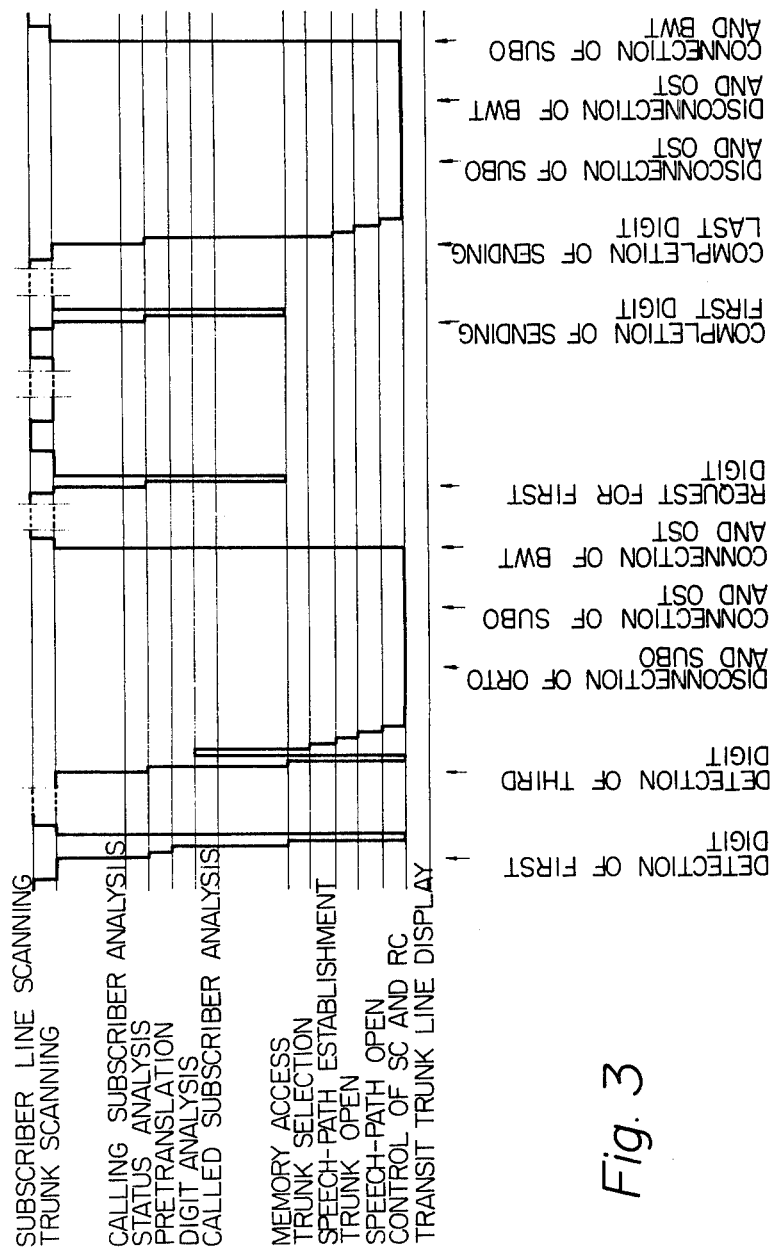
Figure 8:
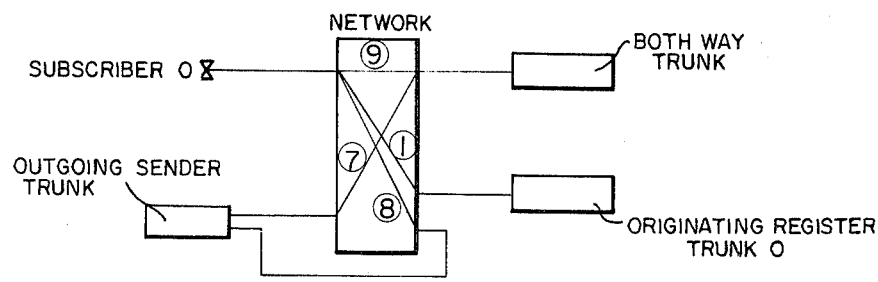

The connection of an outgoing call through the transit trunk line will now be described, by using an example which is provided with the abbreviated dialling service, with reference to the sequence chart, as illustrated in FIG. 3, and the status chart, as illustrated in FIG. 8. The processes from the lifting of the hand-set by a calling subscriber SUB0 until his connection to the originating register trunk ORTO through the establishment of the speech-path ① are the same as the corresponding processes in the cases which have been described hereinbefore. The first digit of the number dialled by the calling subscriber SUB0 is detected by the trunk scanning, as in the case of the intra-office connection, and the number of digits for the abbreviated dialling service is determined, for instance as "3", by the pretranslation. The first digit and the information on the number of digits to be received, i.e., the number "3", are stored in the trunk memory corresponding to the originating register trunk ORTO. The sequence of the following processes from the clearing of the counter of the originating register trunk ORTO until receiving and storing the last or the third digit in the trunk memory is the same as the corresponding sequence in the case of the intra-office connection.

After confirming that the three digits of the dialled number have been fully received, the central controller CC enters the digit-analyzing process and identifies that the call being processed requires the abbreviated dialling service. in the case of the private branch switching system, the abbreviated dialling service is always for the outgoing call through the transit trunk line, and the selection signal to be applied to the transit trunk line is produced by reading out the preregistered signal from the memory, digit by digit, and sending it to the transit trunk line, so that the central controller CC at first selects an idle branch switch trunk BWT and an idle outgoing sender trunk OST. This selecting process is carried out on the trunk memory of the memory MEM, as in the case of the intra-office connection, and the trunk memories corresponding to the two selected trunks are rewritten to the busy status. Similarly, three idle channels are selected on the map of the memory MEM, and the memory bits corresponding to the related links are rewritten to the busy status; namely, one channel between the calling subscriber SUB0 and the outgoing sender trunk OST, another channel between the both way trunk BWT and the outgoing sender trunk OST and still another channel between the calling subscriber SUB0 and the both way trunk BWT. In addition, the three digits of the dialled number, which are stored in the trunk memory corresponding to the originating register trunk ORTO, are transferred to that trunk memory which corresponds to the aforesaid outgoing sender trunk OST, and the speech-path between the calling subscriber SUB0 and the originating register trunk ORTO is opened, as in the case of the aforesaid intra-office connection.

Then, the central controller CC carries out a series of controls in a similar sequence to that for the intra-office connection; namely, the restoration of the speech-path ① between the calling subscriber SUB0 and the originating register trunk ORTO, the establishment of the speech-path ⑦ between the outgoing sender trunk OST and the both way trunk BWT, and the establishment of the speech-path ⑧ between the calling subscriber SUB0 and the outgoing sender trunk OST.

The outgoing sender trunk OST starts the next switching device through the both way trunk BWT, and at the same time, displays a request for the transfer of the selection information at its scanning terminal. Upon reading this request by the trunk scanning, the central controller CC temporarily halts the trunk scanning and starts the process for sending the digits. More particularly, the central controller CC reads out the dial digits stored in the trunk memory corresponding to the outgoing sender trunk OST displaying the request, and finds out the starting address of the abbreviated dial registering memory within the memory MEM by using the first digit of the dial digits thus read out, and gets access to the desired storing location by using the remaining two digits of the dial digits, so as to transfer the subscriber number registered at the location to the trunk memory corresponding to the outgoing sender trunk OST. Then, its first digit is read out and transferred to the outgoing sender trunk OST through the relay controller RC. Upon receiving the digit information, the outgoing sender trunk OST takes a timing corresponding to the pre-pause, and then sends out the dial pulses, whose number is specified by the digit information, to the transit trunk line through the both way trunk BWT. At the same time, the outgoing sender trunk OST monitors for the abandonment of the call by the calling subscriber SUB0 before the complete connection, by using a terminal disposed at the trunk link side of the speech-path network NW. After having sent out the specified number of dial pulses, the outgoing sender trunk OST requests the transfer of the digit information for the next or second digit. The outgoing sender trunk OST sends out the dial pulses corresponding to the second digit transferred from the central controller CC to the transit trunk line, in the same sequence as the preceeding digit, after a pause corresponding to the minimum pause, and then requests the transfer of the digit information for the next following digit. The same sequence of operation is requested, until the last digit is sent out, so as to complete the sending of the selection information.

Upon reading the request for the transfer of the digit information, which is made by the outgoing sender trunk $\overline{OST}$ after sending out the last digit, by the trunk scanning, the central controller CC finds out, through the status analysis, that the selection information has been completely sent out, and enters a procss for controlling the speechpath network. More particularly, the central controller CC at first rewrites the trunk memory corresponding to the outputing sender trunk $\overline{OST}$ to the idle status, and rewrites the memory bits of the map, which correspond to the links relating to the speech-path ⑦ between the outgoing sender trunk $\overline{OST}$ and the both way trunk BWT and the speech-path ⑧ between the calling scriber SUBO and the outgoing sender trunk $\overline{OST}$, to the idle status. Then, in the same sequence as that for the aforesaid intra-office connection, the following processes are executed in sucession; namely, the restoring process of the speech-paths ⑦ and ⑧, and the establishing process of the speech-path ⑨ in accordance with the information relating to the channel between the calling subscriber SUBO and the both way trunk BWT, which information is reserved on the map of the memory MEM, as described above. Thereby, upon response by the called subscriber, the talk between the two subscribers begins.

The charging process will now be described, by using an example of a communication network having charging information delivered from the transit trunk line at the time of response by the called subscriber, wherein the speech-path network NW is formed by using two-wire crossbar switches, and the channel selection is executed by the map within the memory MEM, as in the case of the communication exchange system according to the present invention.

In this case, the conventional charging process using the metering by the C line is not possible, so that the charging process in the aforesaid example is executed by providing the both way trunk BWT with the function of receiving and storing the charging information from the transit trunk line. More particularly, the charging information from the transit line is first received by and stored in the both way trunk BWT, and then the receiving and storing of the charging information are displayed at its scanning terminal. Upon the reading of this display by the trunk scanning, the central controller CC temporarily halts the scanning, and gets access to the memory trunk corresponding to the both way trunk BWT displaying the charging information, so as to obtain the storing location information of the calling subscriber SUBO connected to the both way trunk BWT. In addition, the central controller CC gets access to the charging memory within the memory MEM by using the storing location information thus obtained, reads the cumulative charging count in the storing area corresponding to the aforesaid calling subscriber SUBO, adds one charging count to the cumulative charging count thus read, and writes back the new cumulative charging count thus determined to the aforesaid storing area. At the same time, a reset instruction is edited to clear the information stored at the both way trunk BWT, which reset instruction is sent to the relay controller RC so as to reset the charging display of the both way trunk BWT, and the previously halted trunk scanning is resumed.

In the case where the charge metering is executed by using an electromagnetic counter, the counter corresponding to the calling subscriber SUBO should be indentified from the aforesaid storing location information, instead of getting access to the charging memory, so as to apply the charging pulse to the counter through the relay controller RC. If the charging information is applied at specific intervals, for instance, in the case of long-distance calls, it is sufficient to simply repeat the aforesaid processes.

Figure 4:
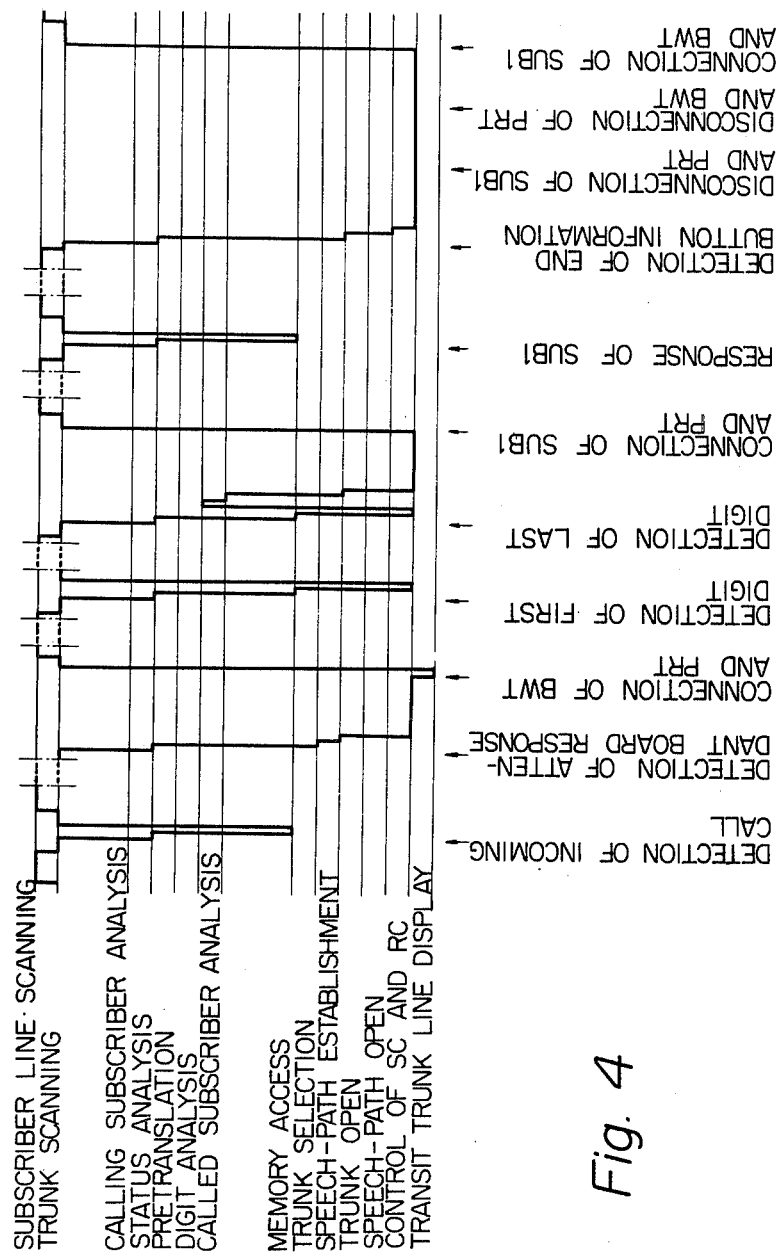
Figure 9:
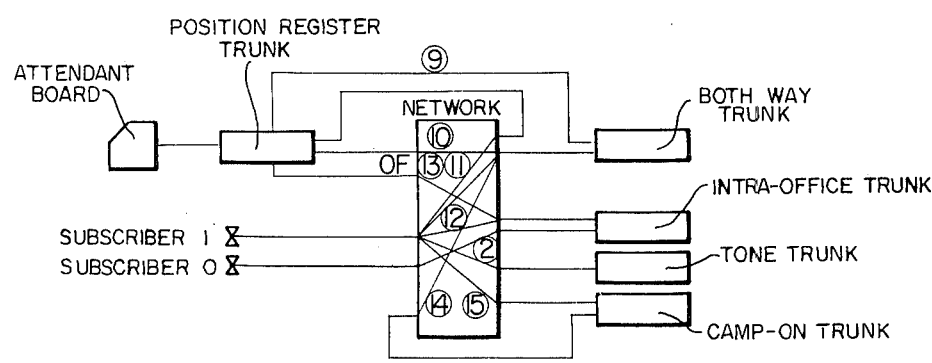

The connection of the incoming call through the transit trunk line will now be described, by referring to the sequence chart, as illustrated in FIG. 4, and the status chart, as illustrated in FIG. 9. When there is an incoming call on a transit trunk line, the both way trunk BWT corresponding to the transit trunk line displays the request for the incoming call processing, and concurrently provides an incoming call display at the attendant board ATT through the speech-path ⑨ connecting the position register trunk PRT to all the both way tranks BWT, e.g., by energizing an indicator lamp at the attendant board. Upon detection of the request for the incoming call processing by the trunk scanning, the central controller CC detects the presence of an incoming call at the both way trunk BWT and stores a start information at the trunk memory corresponding to that branch switch trunk BWT.

When the operator responds to the incoming call after seeing the incoming call display on the attendant board ATT, by operating the intra-office incoming call response button on the attendant board ATT, a response information is displayed at the scanning terminal of the position register trunk PRT. Upon detection of the response information by the trunk scanning, the central controller CC indentifies the specific both way trunk BWT which received the incoming call, based on the aforesaid start information stored in the trunk memory, and starts the connection process for connecting the both way trunk BWT and the position register trunk PRT. This connection process is carried out by controlling the speech-path network NW in the identical sequence to the aforesaid intra-office connection, so as to establish the speech-path ⑩. In order to display the specific transit trunk line handled by the attendant board ATT, the central controller CC transfers the transit line number display information to the corresponding position register trunk PRT through the relay controller RC.

When the attendant board ATT is connected to the both way trunk BWT through the speech-path ⑩, the operator of the attendant board ATT talks with the subscriber on the transit trunk line. If the operator is asked to connect to the subscriber SUB1, the operator sends out the subscriber number of the called subscriber SUB1 by using the sender buttons on the attendant board ATT. The position register trunk PRT receives the subscriber number digit by digit, and converts the digits into binary codes for display at the scanning terminal thereof. The central controller reads out the subscriber number thus displayed by the trunk scanning in the same manner as the aforesaid intra-office connection, and successively stores the subscriber number in the trunk memory corresponding to the aforesaid position register trunk PRT. The transit trunk line side is kept in the holding status during such operations.

Upon confirming the storing of the subscriber number in the aforesaid trunk memory, whose number of digits is determined by the status information indicating the call through the transit trunk line, the central controller executes the digit analysis for identifying the storing location of the called subscriber SUB1 and checks the busy-idle status of the called subscriber. After confirming the idle status of the called subscriber SUB1, the central controller CC selects idle channels between the called subscriber SUB1 and the position register trunk PRT and between the called subscriber SUB1 and the both way trunk BWT, by using the map of the memory MEM, and edits a control instruction of controlling the speech-path network NW, so as to establish the speech-path ⑪ through the switch controller SC and to connect the position register trunk PRT to the called subscriber SUB1.

When connected to the called subscriber SUB1 through the speech-path ⑪, the position register trunk PRT sends out the ringing signal to the called subscriber SUB1 and starts monitoring for detection of this response. The response by the called subscriber SUB1 is reported to the central controller CC by the trunk scanning, so as to rewrite the trunk memory and to display it on the attendant board ATT. When the operator, who has confirmed the display, operates the END button mounted on the attendant boart ATT after conferring with the called subscriber SUB1, it is displayed on the scanning terminal of the position register trunk PRT. Upon reading this display by the trunk scanning, the central controller CC restores the speech-paths ⑩ and ⑪, establishes the speech-path ⑫, edits a control instruction for controlling the speech-path network NW so as to control and reconnection through the switch controller SC, and connects the called subscriber SUB1 to the both way trunk BWT through the speech-path ⑫. Whereby, the talk between the subscriber on the transit trunk line and the called subscriber SUB1 starts. In order to prevent any hit in the circuit to the transit trunk line during the reconnection, the central controller CC keeps it under holding status during the period of times when the aforesaid control is executed, by sending out a temporary hold signal to the specific both way trunk BWT through the relay controller RC.

In this case, if the called subscriber analysis indicates that the called subscriber SUB1 is talking with another subscriber SUB0, the central controller CC sends the busy information to the position register trunk PRT through the relay controller RC and provides the busy display at the attendant board ATT. When the operator finds that the status of the called subscriber SUB1 is busy, if any interrupting or offering talk is necessary, the operator actuates the OF button on the attendant board ATT for sending the request for the offering talk. Upon detacting this request, the central controller CC carries out a search on the trunk memory corresponding to the trunk used for the talk so as to identify the intra-office trunk IOT connected to the called subscriber SUB1, and establishes the speech-path ⑬ between the offering terminal OF of the position register trunk PRT and the intra-office trunk IOT in the sequence as described hereinbefore. It should be noted here that the reason for making the interruption to the trunk from the line link side of the speech-path network NW is due to the structural limitation in that the crossbar switch constituting the speech-path network NW is a two-wire mechanically holding type.

If the subscriber SUB1 asks the operator, through the offering talk by way of the aforesaid speech-path ⑬, to request the calling subscriber on the transit trunk line to wait, the operator of the attendant board ATT passes that message to the calling subscriber through the position register trunk PRT, the speech-path ⑩, and the both way trunk BWT, and concurrently operates the END button mounted on the attendant board ATT. The operation of the END button is displayed on the position register trunk PRT, and if the central controller CC detects this display by the trunk scanning before detecting the response from the called subscriber SUB1, the central controller CC carries out a search on the trunk memory of the memory MEM so as to select an idle camp-on trunk CMPT, and selects idle channels between the both way trunk BWT and the camp-on trunk CMPT thus selected and between the called subscriber SUB1 and the camp-on trunk CMPT, by using the map. Concurrently, the restoration of the position register trunk PRT and the restoration of the speech-paths ⑩ and ⑬ are executed on the trunk memory and the map. Based on the aforesaid selection and restoration operation, control instructions are produced which execute the actual restoration of the position register trunk PRT and the speech-paths ⑩ and ⑬ and the actual connection between the both way trunk BWT and the camp-on trunk CMPT by establishing the speech-path ⑭. Thereby, the attendant board ATT is freed from the processing of the call under question and becomes ready for handling new calls.

Upon detecting the end of talk of the called subscriber SUB1 by the trunk scanning, the central controller CC executes the restoration of the speech-paths used for the connection of the last talk by the same sequence as described hereinbefore, and at the same time, established the speech-path ⑮ by controlling the speech-path network based on the information relating to the reserved channel between the called subscriber SUB1 and the aforesaid camp-on trunk CMPT. Knowing the connection to the called subscriber SUB1, the camp-on trunk CMPT sends the ringing signal to the called subscriber SUB1 and the call-back tone to the subscriber on the both way trunk BWT. The call-back tone sent to the subscriber on the both way trunk BWT is to inform him that the ringing of the called subscriber SUB1 has been started. The response by the called subscriber SUB1 is monitored by the camp-on trunk CMPT, and the central controller CC detects it by the trunk scanning. Upon detection of response by the called subscriber SUB1, the central controller CC edits a control instuction in the same manner as described hereinbefore, for controlling the reconnection of the speech-path network NW, so that the both way trunk BWT is connected to the called subscriber SUB1 through the speech-path ⑫.

In the last mentioned case of causing the incoming call from the transit trunk line to wait by using the camp-on trunk, it is necessary to differentiate the regular busy status of the called subscriber SUB1 from his lockout status due to his forgetting to hang up or other reasons. With the illustrated embodiment, the interrupting connection is possible only from the line link side of the speech-path network NW due to the specific construction of the speech-path network, as pointed out above, so that if the called subscriber is connected to a trunk other than the originating register trunk ORTO or other speech trunks, he cannot be monitored. With conventional systems, it cannot be determined whether the specific subscriber is locked out or not, and the lockout process has been difficult to execute in an effective fashion.

Accordingly, with the illustrated embodiment of the present invention, in the case of the connection through the camp-on trunk CMPT, the lockout status and the busy status are separately displayed, in which two statuses are differentiated by the analysis of the called subscriber SUB1. More particularly, if any lockout information written in the subscriber memory, which is read out during the called subscriber analysis, is detected, the cental controller CC sends out the lockout information on the attendant boart ATT so as to cause the lockout display here.

Upon knowing the lockout status of the subscriber SUB1, the operator of the attendant board ATT operates the howler button and sends out the subscriber number of the called subscriber SUB1 by the sender buttons. The central controller CC reads out such information by the trunk scanning, and selects an idle tone trunk TNT and an idle channel between the tone trunk TNT selected and the called subscriber SUB1, so as to establish the speech-path ②for connecting the called subscriber SUB1 to the tone trunk TNT, while concurrently instructing the tone truck TNT to send out the howler tone. After confirming the train, the tone trunk sends out the howler tone and starts the monitoring for detection of completion of the hanging up operation.

It is needless to say that the aforesaid lockout notification process should preferably be executed as early as possible for ensuring the smooth exchange operation. Accordingly, the operator of the attendant board ATT, as a rule, sends out the howler tone repeatedly to warn the subscriber in the lockout status until his lockout status is removed, based on the subscriber display on the attendant boart ATT, which display has been described hereinbefore with reference to the connection of the calling subscriber and the intra-office connection. Thus, the aforesaid lockout process at the time of interrupting talk is an exceptional process for the lockout status which has not been removed despite the regular warning operations.

Figure 5:
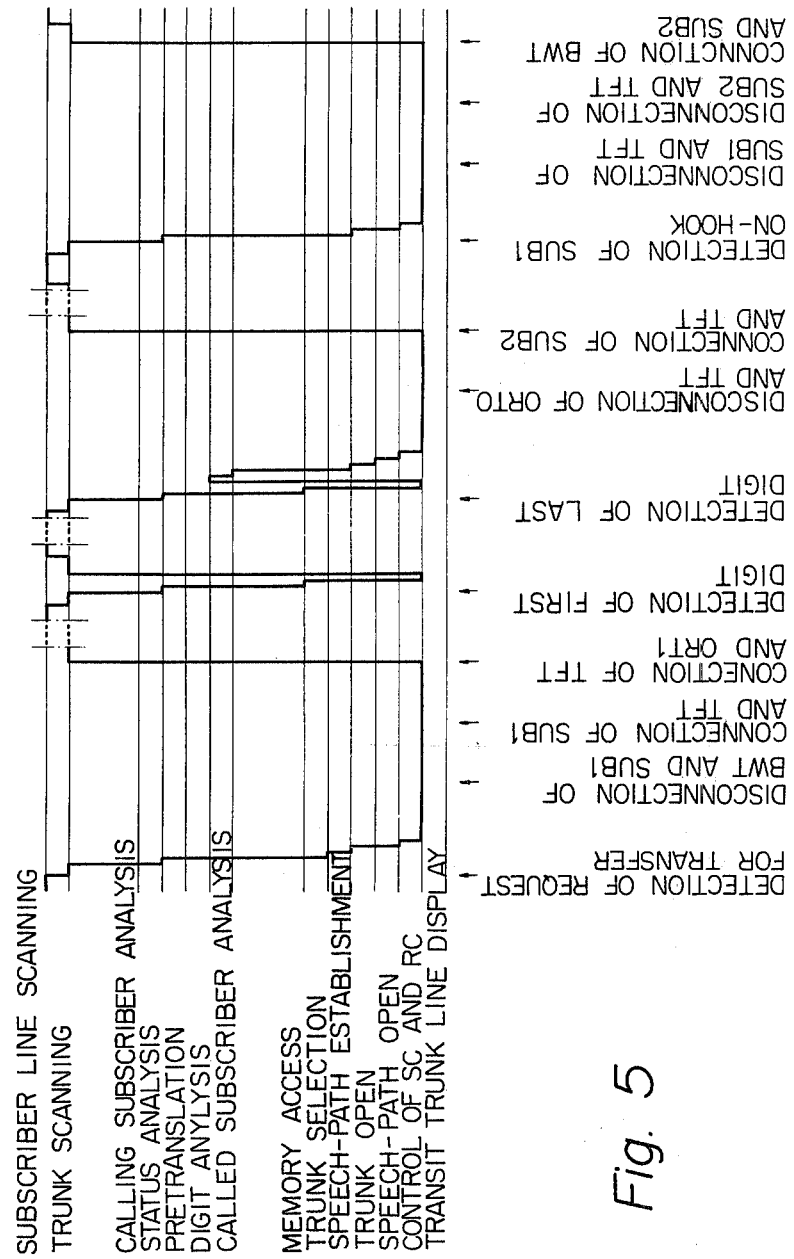
Figure 10:
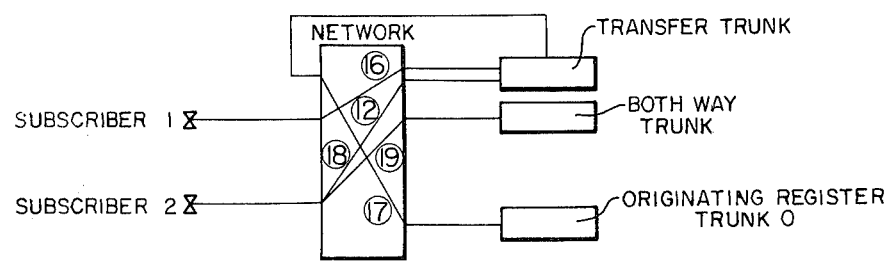

The automatic transfer connection will now be described, by referring to FIGS. 5 and 10. FIG. 5 is a sequence chart showing the operation sequence for the automatic transfer connection, wherein the operations up to the connection of the incoming call on the transit trunk line to the called subscriber SUB1 are not shown, because they are the same as explained hereinbefore. FIG. 10 is a status chart for the automatic transfer connection.

When it becomes necessary to transfer the line from the subscriber SUB1 talking with the subscriber on the transit trunk line through the both way trunk BWT to another subscriber, e.g., the subscriber SUB2, the talking subscriber sends out the transfer request by performing a predetermined operation on his telephone set, such as hooking. This transfer request is received by the both way trunk BWT, and displayed on its scanning terminal. Upon detection of the display by the trunk scanning, the central controller CC confirms by analysis that the display is the transfer request, and performs the following processes; namely, the selection of an idle transfer trunk TFT and an idle originating register trunk ORTO, the selection of idle channels between the transfer trunk TFT thus selected and the subscriber SUB1 and between the transfer trunk TFT and the originating register trunk ORTO thus selected, and the opening of speech-path ⑫. The last mentioned processes are carried out by using the trunk memory and the map of the memory MEM, as in the case of the proceses which have been described hereinbefore. Then, a control instruction is sent to the switch controller SC for controlling the speech-path network NW, so as to execute the actual opening of the speech-path ⑫ and the actual establishment of the speech-paths ⑯ and ⑰, and the central controller CC resumes its trunk scanning. After being disconnected from the speech-path ⑫, the both way trunk BWT is held by the signal from the relay controller RC.

The subscriber SUB1 confirms that the dial tone is sent to him from the originating register trunk ORTO through the transfer trunk TFT, and dials the subscriber number of the subscriber SUB2 to whom the transfer is to be made. The dial information is read by the trunk scanning of the central controller CC digit by digit, in the same manner as described hereinbefore, and the dial information thus read is stored in the trunk memory corresponding to the originating register trunk ORTO. After it is confirmed that the necessary number of digits of the dial information are stored in the aforesaid trunk memory, the dial information is analyzed to find out the storing location of the subscriber SUB2 and to check the idle status of the subscriber SUB2. Then, an idle channel between the subscriber SUB2 and the aforesaid transfer trunk TFT is selected and a control instruction is generated for opening the speech-path ⑰, whereby, the originating register trunk ORTO is opened by disconnecting the speech-path ⑰ through the execution of the control instruction on the speech-path network NW, and concurrently, the speed-path ⑱ is established for connecting the subscriber SUB2 to the transfer trunk TFT while the transfer trunk TFT is instructed to send the ringing signal to the subscriber SUB2 through the relay controller RC. In response to the instruction, the transfer trunk TFT sends the ringing signal to the subscriber SUB2 and the call-back tone to the subscriber SUB1, and detects the response of the subscriber SUB2. When the subscriber SUB2 responds, the transfer trunk TET ceases to send out the ringing signal and the call-back tone, and the two subscribers SUB1 and SUB2 enter the talking status. After conferring with the subscriber SUB2 through the transfer trunk TFT, the subscriber SUB1 leaves the automatic transfer process by hanging up.

The transfer trunk TFT detects completion of the hanging up operation by the subscriber SUB1 and displays the transfer signal on its scanning terminal. Upon reading this display by the trunk scanning, the central controller CC executes the processes of selecting an idle channel between the subscriber SUB2 and the previously held both way trunk BWT and restoring the speech-paths ⑯ and ⑱. Based on such processes, a control instruction is edited for controlling the speech-path network NW, and the actual restoration of the speech-paths ⑯ and ⑱ and the actual establishment of the speech-path ⑲ are executed, so as to reconnect the both way trunk BWT to the subscriber SUB2.

If the subscriber SUB2 is in a status wherein he is prohibited from talking with the subscriber on the transit trunk line, the central controller CC executes, upon detection of completion of the aforesaid hanging up operation by the subscriber SUB1, the called subscriber analysis and identifies that the subscriber class information of the subscriber SUB2 does not permit the receipt of the incoming call from the transit trunk line, and instructs the transfer trunk TFT to send the ringing signal through the relay controller RC. In accordance with this instruction, the transfer trunk TFT sends the ringing signal to the subscriber SUB1, and the response of the subscriber SUB1 is detected by the transfer trunk TFT and reported to the central controller CC. The central controller CC re-establishes the speech-path (2, so as to reconnect the subscriber SUB1 to the both way trunk BWT so as to allow the subscribers connected thereto to talk.

It is also easily arranged to permit the reconnection of the subscriber SUB1 to the both way trunk BWT after the conferring of the two subscribers SUB1 and SUB2, by means of the combination of a simple telephone set operation, e.g., hooking, and the dialling of a special number by the subscriber SUB1.

As is apparent from the foregoing detailed disclosure, the features of the communications exchange system according to the present invention are that various trunks are provided with compound functions including certain logical processes, such as counting, storing, and timing supervising, so as to minimize the requirement for the real time operation; that, in operation, the subscriber scanning and the trunk scanning are normally executed, for monitoring the status of the subscriber lines and the trunks, and upon detection of any status change by the scanning, the scanning is temporarily halted so as to execute a series of control processes until the related call reaches a stable status, i.e., until a series of operations which are necessary for causing one stage transition of the exchange process are completed, and the previously halted scanning is resumed upon completion of the control processes; whereby, the entire exchange process is executed by successively carrying out the series of the control processes in accordance with the requirement therefor.

Therefore, as compared with the conventional exchange system based on the stored program control system, the communication exchange system according to the present invention is characterized in that the execution-controlling program is completely eliminated, and the requirement for the interrupting process function for the central controlller is not as high, whereby, the central controller can be formed by using a low-class processor which is a general purpose small electronic computer, such as one of the recently developed minicomputers. Thus, the present invention provides such an economy in both the hardware and the software that the economic difficulty of the conventional small exchange system of stored program control type, especially in its high unit cost per circuit, is mitigated, so that it has become possible to provide a small capacity communication exchange system of high flexibility, such as a highly flexible private branch switching system.

Although the present invention has been described and illustrated by means of a private branch switching system having a speech-path network of space-divisional type, the present invention is not restricted to such an embodiment. More particularly, the switching type of the speech-path network is not critical in the present invention, and it is needless to say that a speech-path network of time-divisional type can be used in the communication exchange system according to the present invention, and the present invention can be applied to the communication exchange system for central offices, too.

From the foregoing, it will now be apparent that a new and improved electronic exchange system has been found. It should be understood, of course, that the embodiment disclosed is merely illustrative and is not intended to limit the scope of the invention. Reference should be made to the appended claims, therefore, rather than the specification as indicating the scope of the invention.

What is claimed is:

1. A stored program type electronic exchange system for use with equipment for generating dials signals, said system comprising a pluraltiy of trunks, including at least an originating register trunk and an outgoing sender trunk for converting the dial signals between serial pulse signals and parallel character signals and communicating with a programmed computer, character by character, the rest of said trunks fulfilling various compound functions including counting, storing, supervising the timing, and other associated logic operations; a speech-path network having terminals of said trunks and subscriber lines connected thereto, and adapted to selectively interconnect said terminals; a scanner means scanning the status of said subscriber line terminals and said trunks; a switch controller means for controlling said speech-path network; a relay controller means for controlling said trunks; a central controller operating on the basis of a stored program so as to alternately monitor the status of the subscriber line terminals and the status of the trunks by means of said scanner means, to temporarily halt the scanning, upon detection of any status change, for analyzing the status change thus detected, to successively execute a series of processes for realizing that stable status of the exchange system which is required by the analyzed status change, said series of processes being selected as a result of said analyzing the status change, and to resume the previously halted scanning upon completion of said series of processes; and a memory having memory area for storing the program and different data.

2. An electronic exchange system as defined in claim 1, characterized in that the subscriber number of a second subscriber to be called is pre-registered in a corresponding relation to a first called subscriber by means of a call advance trunk (CAVT) in such a manner that the second called subscriber is connected in lieu of the first called subscriber provided that the first called subscriber's line is busy, whereby, when a call to the first called subscriber finds the first called subscriber's line busy, the second called subscriber's line is connected in respose to a simple operation, such as hooking.

3. An electronic exchange system as defined in the claim 1, characterized in that the lockout areas are provided in the memory (MEM) so as to correspond to each of the subscribers served by the system, whereby, when the operative condition of said subscriber line terminal of a subscriber is in a lockout status in which said subscriber is in an off-hook state for an extended period of time without being connected to any other party, lockout information is written in the lockout memory corresponding to said subscriber while displaying the subscriber information relating to said lockout status subscriber on an attendant board (ATT), and the subscriber in the lockout status is connected to a tone trunk (TNT) sending howler tone by direction of subscriber information and a howler tone request which are sent from the attendant board, so as to send the howler tone from said tone trunk to the subscriber in the lockout status.

4. An electronic exchange system as defined in the claim 1, characterized in that a cumulative charging count is automatically computed by a charging means for each subscriber, and charging information from a transit trunk line is once stored and displayed in a predetermined trunk (BWT), and the central controller reads out the charging information through the scanner means and identifies the subscriber connected to said trunk, so as to add one charging count to the cumulative charging count of the subscriber.

5. An electronic exchange system as defined in the claim 1, characterized in that the system includes a trunk (CMPT) having camp-on function, which trunk is further provided with function of sending out ringing signal and call-back tone, whereby at the time of camp-on and after camp-on busy, the ringing signal and call-back tone are sent out from said trunk.

* * * * *

UNITED STATES PATENT AND TRADEMARK OFFICE
CERTIFICATE OF CORRECTION

PATENT NO. : 4,009,337
DATED : February 22, 1977
INVENTOR(S) : Shigeo Sakai, et al It is certified that error appears in the above-identified patent and that said Letters Patent are hereby corrected as shown below:

Col. 7, line 67 - correct spelling of "embodiment".

Col. 8, line 67 - change "BPMM" to --BPM--.

Col. 9, lines 34-35 - "intraoffice" should be changed to --intra-office--.

Col. 10, line 40 - correct spelling of "the".

Col. 16, line 6 - change "Is" to --is--.

Col. 20, line 12 - after "OST" insert a --,--.

Col. 21, line 1 - change "requested," to --repeated,--.

Col. 21, line 9 - correct spelling of "process".

Col. 21, line 17 - change "scriber" to --subscriber--.

Col. 21, line 44 - after "transit" insert --trunk--.

Col. 22, line 46 - after "transit" insert --trunk--.

Col. 23, line 11 - Delete "of" second occurrence and insert --for--.

Col. 23, line 19 - change "this" to --his--.

Col. 23, line 32 - change "and" to --the--.

Col. 23, line 54 - correct spelling of "detecting".

UNITED STATES PATENT OFFICE
CERTIFICATE OF CORRECTION

Patent No. 4,009,337   Dated February 22, 1977

Inventor(s) Shigeo Sakai, et al.   Page 2 of 3

It is certified that error appears in the above-identified patent and that said Letters Patent are hereby corrected as shown below:

Col. 24, line 34 - change "established" to --establishes--.

Col. 24, line 49 - correct spelling of "instruction".

Col. 25, line 13 - change "here" to --there--.

Col. 25, line 12 - correct spelling of "board".

Col. 25, line 36 - correct spelling of "board".

Col. 26, line 42 - change "TET" to --TFT--.

Col. 27, line 18 - change "communications" to --communication--.

Col. 27, line 52 - delete "in".

Col. 28, line 12 - correct spelling of "plurality--.

Col. 28, line 11 - change "dials" to --dial--.

UNITED STATES PATENT OFFICE
CERTIFICATE OF CORRECTION

Patent No. 4,009,337  Dated February 22, 1977

Inventor(s) Shigeo Sakai, et al.  Page 3 of 3

It is certified that error appears in the above-identified patent and that said Letters Patent are hereby corrected as shown below:

Col. 28, line 40 - change "area" to --areas--.

Col. 28, line 41 - after "in" insert --the--.

Col. 28, line 51 - correct spelling of "response".

Col. 28, line 54 - after "that" delete "the".

Signed and Sealed this

Tenth Day of May 1977

[SEAL]

Attest:

RUTH C. MASON  
*Attesting Officer*

C. MARSHALL DANN  
*Commissioner of Patents and Trademarks*